United States Patent
Jonas et al.

[15] 3,687,995
[45] Aug. 29, 1972

[54] ORGANOSILICON COMPOUNDS

[72] Inventors: David Andrew Jonas, Arranmore, Brynna Road, Pencoed; William John Owen, 21 Nailsea Court, Sully, Penarth, both of Glamorgan, Wales

[22] Filed: Nov. 17, 1970

[21] Appl. No.: 90,462

[30] Foreign Application Priority Data
Nov. 17, 1969 Great Britain............56161/69

[52] U.S. Cl....260/448.8 R, 260/46.5 R, 260/46.5 P, 260/448.2 N
[51] Int. Cl..............................C07f 7/04, C07f 7/18
[58] Field of Search...............................260/448.8 R

[56] References Cited

UNITED STATES PATENTS

| | | | |
|---|---|---|---|
| 2,888,454 | 5/1959 | Bailey | 260/448.8 R X |
| 2,983,744 | 5/1961 | Knoth | 260/448.8 R X |
| 2,983,745 | 5/1961 | Speier | 260/448.8 R X |
| 3,509,191 | 4/1970 | Atwell | 260/448.8 R X |

OTHER PUBLICATIONS

Bazant et al., " Organosilicon Compounds," Vol. 1, Academic Press Inc., N.Y. (1965), p. 184.
Noll, " Chemistry and Technology or Silicones," Academic Press Inc., N.Y. (1968), p. 82.

*Primary Examiner*—Tobias E. Levow
*Assistant Examiner*—P. F. Shaver
*Attorney*—Herbert H. Goodman

[57] ABSTRACT

Novel silacyclobutanes of the formula

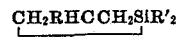

in which R is hydrogen or an alkyl radical having less than 7 carbon atoms and R' represents an alkoxy radical having less than 5 carbon atoms or an amino radical. They are useful as cross-linking agents and intermediates for organosilicon polymers.

3 Claims, No Drawings

ORGANOSILICON COMPOUNDS

This invention relates to novel organosilicon compounds.

Silacyclobutanes in which the organic substituents attached to the silicon atom are monovalent hydrocarbon radicals or halogenated hydrocarbon radicals are known. It is also known that the said silacyclobutanes may be converted to organosilicon polymers in which the silicon atoms in the main polymer chain are joined by propylene radicals, the formation of such polymers involving the opening of the silacyclobutane ring structure. This invention is concerned with the provision of novel silacyclobutanes which can be employed as intermediates in the preparation of novel organosilicon polymers containing silacyclobutane ring structures. Such polymers are of particular interest since the presence of the silacyclobutane structures therein endows the polymer with a potential cross-linking capability.

According to this invention there are provided organosilicon compounds having the general formula

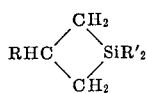

wherein R represents a hydrogen atom or an alkyl radical having less than seven carbon atoms, and R' represents an alkoxy radical having less than five carbon atoms or a radical of the formula $-NR''_2$, in which each R'' is a hydrogen atom or an alkyl radical.

In the general formula R represents, for example the methyl, ethyl, n-butyl or n-pentyl radicals. The radical R'' may be for example, the methoxy, ethoxy or isopropoxy radical or the amino radical $-NR''_2$, in which each R'' is hydrogen or an alkyl radical. Examples of such amino radicals are $-NH_2$, $-NHCH_3$, $-N(CH_3)_2$, $-N(nC_4H_9)_2$ and $-NH(C_{18}H_{37})$. The silacyclobutane compounds of particular interest as intermediate for the preparation of organosilicon polymers are those in which R' represents an alkoxy radical, the methoxy and ethoxy compounds being most preferred.

The compounds of this invention in which R' represents the alkoxy radical may be prepared by a process involving (1) the reaction of magnesium on the compound $X_3SiCH_2CHR\,CH_2Y$, wherein X and Y each represent a chlorine or bromine atom and may be the same or different, X and Y preferably being chlorine, and R is as defined hereinabove, under conditions whereby MgXY is produced as the by-product, followed by (2) alkoxylation of the silicon-bonded chlorine or bromine atoms in the product. In order to preserve the silacyclobutane ring structure, the process is desirably carried out in the absence of substances, generally acidic or basic materials, which may attack and open the ring structure. Conversion of the silicon-bonded halogen atoms to alkoxy radicals (alkoxylation) by reaction of the halogenated silacyclobutane with an alcohol gives rise to the presence of a hydrogen halide in the reaction mixture. Such a route to the alkoxylated silacyclobutane is thus best avoided. We have however, found that the alkoxy-containing organosilicon compounds of this invention can be prepared by a novel process involving the reaction of the corresponding halogenated silacyclobutane with an alkyl orthoformate.

This invention therefor includes a process for the preparation of the alkoxylated silacyclobutanes of this invention which comprises (a) reacting (i) magnesium with (ii) an organosilicon compound of the formula $X_3Si\,CH_2\,CHRCH_2\,Y$ with the formation of a halogenated silacyclobutane and the elimination of MgXY as a by-product and (b) contacting the halogenated silacyclobutane produced in (a) with an alkyl orthoformate $HCR'_3$, wherein in the general formula R' represents an alkoxy radical containing less than 5 carbon atoms and R, X and Y are as defined herein.

The compounds of this invention wherein R' represents the $-NR''_2$ radical may be prepared by reaction of the product obtained according to step (a) in the above-described process with a compound of the general formula $HNR''_2$, wherein R'' is as herein defined. Examples of such compounds are ammonia, methylamine, dimethylamine, diethylamine and octadecylamine. This process for preparing the amino compounds is also included within the scope of this invention.

Step (a) of the process is desirably carried out in the presence of one or more organic solvents, particularly ethers, for example diethyl ether, tetrahydrofuran, dioxan, and mixtures of these with e.g. benzene, toluene and xylene. The reactions may be expedited by the application of heat and/or by activation of the magnesium by contact with iodine. Preparation of the desired alkoxylated or aminated silacyclobutane may then be achieved by contacting the product of step (a) e.g. the compound

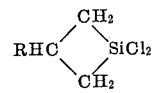

with the alkyl orthoformate, or with the amino compound as appropriate. Preferably conversion of the halogenated silacyclobutane to the amino derivative is carried out in the presence of an acceptor for the by-produced hydrogen halide e.g. triethylamine or pyridine. If desired heat may be applied to increase the reaction rate. However, the application of heat is not normally required as conversion of the silicon-bonded chlorine atoms to alkoxy groups or amine groups takes place readily at normal temperatures.

The compounds of this invention may be reacted with organo-silicon materials containing = Si OH groups and are therefore useful as cross-linking agents for organosilicon polymers. They are also useful as intermediates in the preparation of organosilicon resins and compounds containing silacyclobutane structures.

The following examples illustrate the invention.

EXAMPLE 1

Magnesium (19.5 g.) which had been activated by contact with iodine vapor, was added gradually over 8 hours to a solution of gamma chloropropyltrichlorosilane (106 g.) in diethyl ether (500 ml.). The mixture was then refluxed for a further 24 hours, filtered and the filtrate fractionally distilled to yield 1,1-dichloro-1-sila-cyclobutane.

To this product (20 g.) was added, dropwise, methyl orthoformate, (32 g.) and the mixture stirred overnight at room temperature. Fractionation of the reaction mixture yielded 1,1-dimethoxy-1-sila-cyclobutane (14.5 g.) b.p. 126°–128° C.

EXAMPLE 2

1,1-dichloro-1-silacyclobutane (7.0 g.) was added dropwise, to a solution of dimethylamine (4.5 g.) and triethylamine (10.1 g.) in ether (30 ml.) at −10 ° C. The mixture was then filtered and distilled to yield 1,1-bis(dimethylamino)-1-silacyclobutane (6.8 g., 87 percent) as a colorless liquid (b.p. 90°/80 mm). The infrared and nuclear magnetic resonance spectra were consistent with the structure of the product.

That which is claimed is:

1. Organosilicon compounds having the general formula

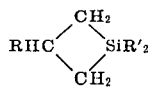

wherein R represents an atom or radical selected from the group consisting of hydrogen atoms and alkyl radicals having less than 7 carbon atoms and R' represents alkoxy radicals having less than 5 carbon atoms.

2. Organosilicon compounds as claimed in claim 1 wherein R' represents an alkoxy radical selected from the group consisting of the methoxy radical and the ethoxy radical.

3. The compound 1,1-dimethoxy-1-silacyclobutane.

* * * * *

UNITED STATES PATENT OFFICE
CERTIFICATE OF CORRECTION

Patent No. 3,687,995          Dated  August 29, 1972

Inventor(s) JONAS and OWEN

It is certified that error appears in the above-identified patent and that said Letters Patent are hereby corrected as shown below:

Title page, left column, between "[72]" and "[22]", insert --[73] Assignee: Dow Corning Limited, London, England--

Signed and sealed this 13th day of March 1973.

(SEAL)
Attest:

EDWARD M. FLETCHER, JR.
Attesting Officer

ROBERT GOTTSCHALK
Commissioner of Patents